3,257,339
REACTION PRODUCT OF AN ORGANIC POLYISO-
CYANATE AND AN ALKYLENE OXIDE ADDUCT
OF A BIS(AMINOPHENYL) SULFONE
Fritz Hostettler and Eugene F. Cox, Charleston, and William H. Cook, South Charleston, W. Va., assignors to Union Carbide Corporation, a corporation of New York
No Drawing. Filed July 22, 1963, Ser. No. 296,857
3 Claims. (Cl. 260—2.5)

The invention relates to new and useful polyurethane compositions. In a particular aspect, the invention relates to compositions which comprise the reaction product of an organic polyisocyanate and an alkylene oxide adduct of a bis(aminophenyl) sulfone.

It has been discovered that polyurethanes having desirable properties can be produced from alkylene oxide adducts of bis(aminophenyl) sulfones. Polyurethane foams, and in particular foams of the closed-cell rigid type, that are produced from alkylene oxide adducts of bis-(aminophenyl) sulfones are found to possess excellent properties at both high and low temperatures, when compared with foams produced from conventional polyols.

The bis(aminophenyl) sulfones employed in the invention can be represented by Formula I:

(I) 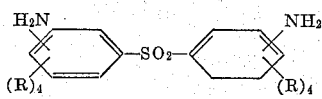

wherein each R individually represents hydrogen, alkyl, chloro, amino, alkylamino, dialkylamino, alkoxy, or the like. Representative sulfones that fall within the class contemplated by the invention include bis(4-aminophenyl) sulfone, bis(3-aminophenyl) sulfone, bis(3-chloro-4-aminophenyl) sulfone, 3-chloro-4-aminophenyl 4-aminophenyl sulfone, bis(methyl-4-aminophenyl) sulfones, bis-(aminodimethylphenyl) sulfones, bis(ethyl-aminophenyl) sulfones, bis(2,4-diaminophenyl) sulfone, 2,4-diaminophenyl 4-aminophenyl sulfone, bis(amino-N-methyl-aminophenyl) sulfones, bis(amino-N,N-dimethylaminophenyl) sulfone, bis(4-amino-3-methoxyphenyl) sulfone, and the like. The unsubstituted bis(aminophenyl) sulfones are preferred, especially bis(4-aminophenyl) sulfone. In the cases where the aromatic rings contain one or more alkyl, alkylamino, dialkylamino, or alkoxy substituents, it is preferred that the alkyl moieties have not more than 4 carbon atoms.

The bis(aminophenyl) sulfones are known compounds that are prepared by known procedures. For example, the preparation of bis(4-aminophenyl) sulfone is described in German Patent 964,593.

The alkylene oxide adducts of bis(aminophenyl) sulfones are produced by reacting one or more alkylene oxides with one or more bis(aminophenyl) sulfones. The alkylene oxides contemplated are vicinal epoxyalkanes such as ethylene oxide, propylene oxide, 2,3-butylene oxide, 1,2-butylene oxide, isobutylene oxide, epoxypentanes, epoxyhexanes, epoxycyclohexane, and the like. The preferred alkylene oxides are those having from 2 to 4 carbon atoms, for instance, ethylene oxide, propylene oxide, and butylene oxides. Also, aliphatic haloepoxides such as 3-chloro-1,2-epoxypropane can be employed to a limited extent, preferably in admixture with one or more other alkylene oxides. For instance, it is possible to first react all of the amino hydrogen atoms of the bis(aminophenyl) sulfone with ethylene oxide or propylene oxide and to then react the resulting polyol with 3-chloro-1,2-epoxypropane alone or in admixture with one or more other epoxides. The bis(aminophenyl) sulfone and alkylene oxide are reacted in proportions such that the hydroxyl number of the polyol product is in the range of from about 200 to about 530 for rigid polyurethane foam applications, although hydroxyl numbers as low as, for instance, 30 are useful in many applications. The alkylene oxide and bis(aminophenyl) sulfone are desirably reacted in the presence of a catalytic quantity of a catalyst such as potassium hydroxide, other alkali and alkaline earth hydroxides, or trimethylamine. The catalyst is usually employed in an amount in the range of from about 0.02 weight percent to about 5 weight percent, based upon weight of reactants.

Conventional reaction equipment can be employed for the alkylene oxide addition, which will normally take from about 2 hours to about 20 hours at a temperature in the range of from about 80° C. to 200° C. If desired, a diluent can be used for the alkylene oxide addition. Suitable diluents include dialkyl ethers of alkylene glycols, benzene, toluene, dioxane, and the like. After the addition of alkylene oxide, the polyol product can be recovered by conventional procedures. For instance, the polyol can be passed through an ion exchange resin to neutralize and remove the catalyst, after which any inert diluent present can be removed by distillation.

The polyurethane products of the invention are produced by reacting an alkylene oxide adduct of a bis-(aminophenyl) sulfone with an organic polyisocyanate. In some cases, it may be desirable to employ one or more additional polyols along with the alkylene oxide adducts of bis(aminophenyl) sulfones.

A large variety of polyols can be employed for this purpose, for instance, one or more polyols from the following classes of compositions:

(a) Hydroxyl-terminated polyesters and polyesterethers;

(b) Polyhydroxyalkanes and alkylene oxide adducts thereof;

(c) Trialkanolamines and alkylene oxide adducts thereof;

(d) Alcohols derived from certain mono- and polyamines by addition of alkylene oxide;

(e) Non-reducing sugars and sugar derivatives and alkylene oxide adducts thereof;

(f) Alkylene oxide adducts of aromatic amine/phenol/aldehyde ternary condensation products;

(g) Alkylene oxide adducts of phosphorus and polyphosphorus acids, and various hydroxyl-terminated phosphites and phosphonates;

(h) Alkylene oxide adducts of polyphenols;

(i) Polytetramethylene glycols;

(j) Functional glycerides, such as castor oil; and the like.

Illustrative hydroxyl-terminated polyesters are those which are prepared by polymerizing a lactone (preferably, an epsilon-caprolactone) in the presence of an active hydrogen-containing starter as disclosed in U.S. Patent 2,914,556. Polyesters from adipic acid and diols such as ethylene glycol, propyene glycol, diethylene glycol, dipropylene glycol, and the like, and triols such as 1,1,1-trimethylolpropane, 1,2,6-hexanetriol glycerol, and others, are also useful. Copolymers of lactones and alkylene oxides can also be used with good results.

Illustrative polyhydroxyalkanes include, among others, ethylene glycol, propylene, glycol, 1,2-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamines. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides have 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2- 1,3-, 1,4-, 1,5-, and 1,6-hexanediamine, phenylenediamines, toluenediamines, naphthalenediamines, and the like. Among the compounds of the above groups which are of particular interest are, among others, N,N,N',N' - tetrakis(2 - hydroxyethyl)ethylenediamine, N,N,N',N' - tetrakis(2 - hydroxypropyl)ethylenediamine, N,N,N',N'',N'' - pentakis(2-hydroxypropyl)diethylenetriamine, phenyldiisopropanolamine and higher alkylene oxide adducts of aniline, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glucosides such as ethylene glycol glucoside, propylene glycol glycoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, 2,2-bis(para - hydroxyphenyl)propane, bis(para-hydroxyphenyl)methane, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide.

Another useful class of polols are the polytetramethylene glycols, which are prepared by polymerizing tetrahydrofuran in the presence of an acidic catalyst.

Also useful are castor oil and alkylene oxide adducts of castor oil.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where

O=hydroxyl number of the polyol
f=average functionality, that is, average number of hydroxyl groups per molecule of polyol
m.w.=average molecular weight of the polyol.

The exact polyol employed depends upon the end-use of the polyurethane product. For example, when used to prepare foams, the average functionality and the hydroxyl number are selected properly to result in flexible, semiflexible, or rigid foams. The above polyols preferably possess a hydroxyl number of from about 200 to about 700 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the above polyol coreactants.

A wide variety of organic polyisocyanates can be employed in the invention. For instance, aromatic polyisocyanates such as 2,4- and 2,6-tolylene diisocyanate, phenylene diisocyanates, chlorophenylene diisocyanates, naphthalene diisocyanates, xylylene diisocyanates, bis(4-isocyanatophenyl)methane, tris(4 - isocyanatophenyl)-methane, isocyanates produced by phosgenation of the condensation products of aniline and formaldehyde, and the like are useful. Also, aliphatic polyisocyanates such as hexamethylene diisocyanate are useful in the invention. Additional useful organic polyisocyanates are disclosed in an article by Siefken, Annalen, 562, pages 122–135 (1949).

The polyurethane products of the invention can take the form of foamed products, elastomers, surface coatings, castings, and the like. The foamed products can be produced, for example, by the one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free —NCO groups (e.g., from 20 to 50 percent), and this product is subsequently foamed by reaction with polyol and foaming agent. In producing elastomers, the prepolymer technique is useful. In the prepolymer technique, the isocyanate is reacted with a slightly less than stoichiometric quantity of polyol to produce a prepolymer having a low percentage (e.g., from 1 to 10 percent) of free —NCO groups. The prepolymer is subsequently converted into an elastomer by reacting with a cross-linking agent having reactive hydrogen atoms such as a diamine, for instance, a bis(aminochlorophenyl) methane. In producing surface coatings, there are several types of known reaction techniques which can be employed. The following are representative:

(1) Use of a prepolymer having a low percentage of free —NCO groups that is cured by atmospheric moisture;

(2) A two-component system in which a prepolymer is mixed with a polyol just before application;

(3) A one-package system comprising two ingredients and requiring a heat cure. One of the ingredients is a polyisocyanate prepolymer in which the free —NCO groups have been blocked (e.g., with phenol) to make the isocyanate groups non-reactive until unblocked by heat. The second ingredient is a polyol.

(4) A one-component system containing no free isocyanate. Unsaturated fatty acid diglycerides are reacted with polyisocyanate to cross-link the ester chains. Cure occurs through conventional oxidative drying of the fatty acid chains.

Various techniques employed in the production of polyurethanes, along with a discussion of the commonly-used component compositions, are discussed by Saunders et al. in "High Polymers, vol. XVI—Polyurethanes: Chemistry and Technology, I. Chemistry," Interscience Publishers.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbons which have boiling points between about $-40°$ C. and $70°$ C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1 - dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2 - chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethamine, triethylamine, N-methylmorpholine, N-ethylmorpholine, N,N-dimethylbenzylamine, N,N-dimethylethanol amine, N,N,N',N'-tetramethyl-1,3-butanediamine, triethanolamine, 1,4-diazabicyclo[2.2.2]octane, 1,2,4-trimethylpiperazine, bis-(dimethylaminomethyl)amine, N,N,N',N'-tetraalkyl-1,3-propanediamines, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-dimethylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis-(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, from about 0.001 percent to about 5 percent, based on weight of the reaction mixture.

In producing foamed reaction products, it is also within the scope of the invention to employ small amounts, e.g., about 0.001% to 5.0% by weight on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils, commercially available as "Selectrofoam 6903," "Emulphor EL-720," and others. Although the use of an emulsifier is desirable to influence the type of foam structure that is formed, the foam products of the invention can be prepared without emulsifiers in some cases.

The polyurethanes of the invention are highly useful compositions. For example, the foams can be used in insulating applications, as padding and cushions, and the like. The elastomers can be used as gasketing materials, for instance, as clay pipe sealers. The surface coatings can be used to coat metallic, wooden, glass, and the like, objects. Castable polyurethanes can be used in encapsulation of electrical parts, in making molded articles, and the like.

The examples which follow illustrate various aspects of the invention.

Example 1

Bis(4-aminophenyl) sulfone (1,368 grams) was charged to a 5 liter Pyrex reaction flask equipped with agitator, nitrogen inlet, reflux condenser, and a dropping funnel. The diamine was melted and heated to 170° C. under an atmosphere of nitrogen. Propylene oxide (1,178 grams) was added dropwise while the temperature of the reaction mixture was maintained in the range, 150–185° C., at atmospheric pressure. Then 3.8 grams potassium hydroxide was added, and 598 grams additional propylene oxide was added at 150–175° C. At this point the hydroxyl number of the product was found to be 334. The potassium hydroxide was removed by passing a methanol solution of the product through a column of strong-acid type ion exchange resin.

A portion of the polyol (2,040 g.) was then charged to a reaction flask similar to the one described above, 4.2 g. potassium hydroxide was added, and propylene oxide again was added dropwise to the polyol at 150° C. It was found, however, that the propylene oxide would not react under these conditions. Additional potassium hydroxide (2.1 g.) was added, followed by 150 grams propylene carbonate. This mixture was heated for one hour at 170° C., and then was diluted with 2-propanol and refined by passing successively through strong-base and strong-acid ion exchange resin columns. After stripping out the 2-propanol, the refined polyol was found to have a hydroxyl number of 311, which corresponds to an average of 2.03 propylene oxide residues per hydroxyl-terminated polyether chain.

Example 2

The polyol of Example 1 was employed in the following formulation to produce a rigid polyurethane foam from a hand batch, one-shot method:

| Component: | Parts by weight |
|---|---|
| Polyol of Example 1 | 70 |
| Polyol A [1] | 30 |
| Silicone surfactant [2] | 1.5 |
| Dibutyltin dilaurate | 0.05 |
| Trichloromonofluoromethane | 30 |
| Organic polyisocyanate [3] | 109.3 |

[1] The propylene oxide adduct of diethylenetriamine having a hydroxyl number of 711.
[2] A composition having the formula:

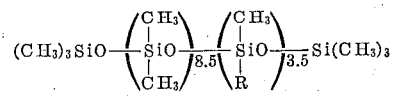

wherein R is a group of the formula:

$$CH_3(OC_2H_4)_{16}OC_3H_6-$$

[3] A polyisocyanate having an equivalent weight of 135.6. The polyisocyanate was produced by phosgenation of the condensation product of aniline and formaldehyde.

The resulting foam had a cream time, foam time, and tack-free time of 12, 85, and 62 seconds, respectively. A sample of the core exhibited 88.6% closed cells and had a density of 2.46 pounds per cu. ft. At 25° C. the compressive strength was 44.6 p.s.i. parallel and 16.1 p.s.i. perpendicular to the direction of foam rise.

Another foam was prepared using an identical formulation with the exception that 38 parts of fluorocarbon was employed instead of 30 parts. The resulting foam had a core density of 2.02 pounds per cu. ft. and exhibited 87.6% closed cells. The compressive strengths were 25.0 and 11.0 p.s.i. parallel and perpendicular to the rise, respectively.

What is claimed is:

1. A composition that comprises the reaction product of (a) an organic polyisocyanate and (b) an alkylene oxide adduct of a bis(aminophenyl) sulfone, wherein said alkylene oxide has from 2 to 4 carbon atoms, wherein said adduct has a hydroxyl number of from about 30 to about 530, and wherein said bis(aminophenyl) sulfone is a compound of the formula:

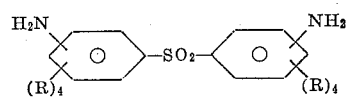

wherein each R individually is selected from the group consisting of hydrogen, alkyl, chloro, amino, alkylamino, dialkylamino, and alkoxy.

2. The composition of claim 1 wherein said composition is foamed.

3. The composition of claim 1 wherein all of the R variables are hydrogen.

References Cited by the Examiner

UNITED STATES PATENTS 3,075,927    1/1963    Lanham _____ 260—2.5

FOREIGN PATENTS 755,533    8/1956    Great Britain.

LEON J. BERCOVITZ, *Primary Examiner.*

D. E. CZAJA, *Assistant Examiner.*